No. 755,404. PATENTED MAR. 22, 1904.
J. A. SMITH.
TYPE ARM BEARING FOR TYPE WRITING MACHINES.
APPLICATION FILED OCT. 24, 1903.
NO MODEL.
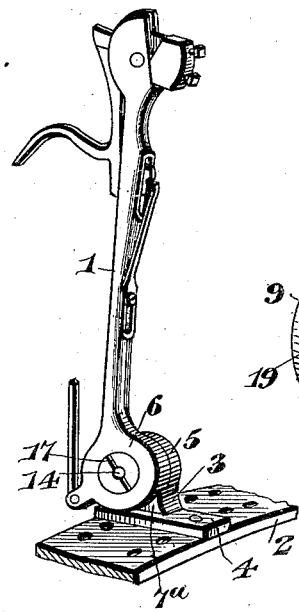
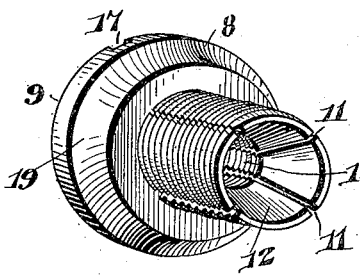
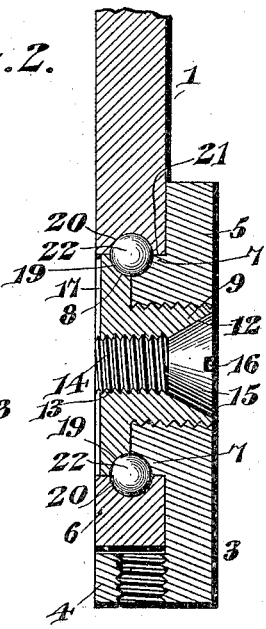
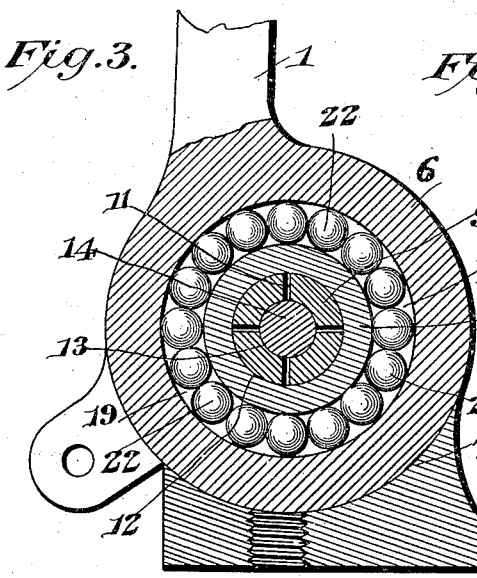
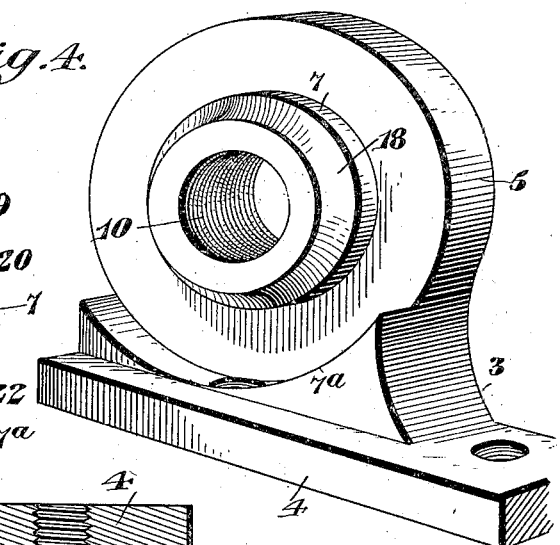
John A. Smith, Inventor
Witnesses No. 755,404. Patented March 22, 1904.

UNITED STATES PATENT OFFICE.

JOHN ASBURY SMITH, OF CLEVELAND, OHIO, ASSIGNOR TO ELLIOTT-FISHER COMPANY, OF NEW YORK, N. Y., A CORPORATION OF DELAWARE.

TYPE-ARM BEARING FOR TYPE-WRITING MACHINES.

SPECIFICATION forming part of Letters Patent No. 755,404, dated March 22, 1904.

Application filed October 24, 1903. Serial No. 178,400. (No model.)

*To all whom it may concern:*

Be it known that I, JOHN ASBURY SMITH, a citizen of the United States, residing at Cleveland, in the county of Cuyahoga and State of Ohio, have invented a new and useful Type-Arm Bearing for Type-Writing Machines, of which the following is a specification.

This invention relates to type-writing machines, and more particularly to a novel antifrictional type-arm bearing therefor. It is well understood by those skilled in the art that the ideal type-arm bearing must be of slight width, since a large number of arms are necessarily mounted in a comparatively small space, and notwithstanding its diminutive proportions in a lateral direction must be so constructed as to provide for easy adjustment to compensate for wear and must be capable of resisting the constant vibration incidental to the impact of the type against the platen and to the quick rebound of the type-bar and its sudden arrest by the buffer-ring.

To the production of a bearing possessing these several requisites my present invention resides in rigidly mounting upon the type-bar-supporting ring a square bracket in the form of a plate having extended from one side face thereof a circular bearing member, opposed to which is a bearing-disk of corresponding diameter. The type arm or bar is formed with an eye for the reception of the two bearing members, and a single row of balls is mounted in a ball-race defined by an internal ball-groove in the type-arm, at the center thereof, and an external groove formed conjointly in the two bearing members and opposed to the groove in the arm. The bearing-disk is adjustably secured to the bracket by means of an externally and internally threaded expansible sleeve which when properly adjusted is expanded and locked by a locking-screw having a wedge-shaped sleeve-expanding head. These and other features of the bearing, hereinafter more particularly described, are illustrated in the accompanying drawings and will be succinctly defined in the appended claims.

In said drawings, Figure 1 is a perspective view of a type-arm and its mounting. Fig. 2 is a vertical sectional view through a portion of the type-arm and its bearing. Fig. 3 is a sectional view of the bearing on a line at right angles to the line of section of Fig. 2. Fig. 4 is a detail perspective view of the bracket. Fig. 5 is a similar view of the bearing-disk and the expansible sleeve.

Like numerals of reference designate corresponding parts in the several figures of the drawings.

1 indicates a type-bar mounted upon a type-bar-supporting ring 2 by means of a bearing-bracket 3, a portion of which is shown in Fig. 1, being a characteristic element of the Fisher type-writing machine exemplified as, for instance, in Patent No. 573,868. It will of course be understood that the type-arm bearing to be described may be employed in various other relations and that the bracket 3 may be mounted as a pendant or may outstand laterally from its support, according to the character of the machine in which it is employed.

The bracket 3 comprises a base 4, screwed or otherwise secured to the ring 2, and a narrow vertically-disposed plate 5, rising from the upper surface of the base, at one side thereof, and of generally circular form. The plate 5 preferably corresponds in diameter to that of the hub 6 of the type-arm, and from one side thereof projects an angular bearing member 7 and an arcuate seat 7$^a$, the latter conforming to the periphery of the hub 6, but not disposed in actual contact therewith when the bearing is devoid of lost motion. Opposed to the bearing member 7 is a second bearing member in the form of a disk 8 of corresponding diameter adjustably secured to the bracket by means of an expansible internally-threaded sleeve 9, extending from one side of the disk 8 and screwed into an axial opening 10 in the bracket. The sleeve 9 is preferably made expansible by means of longitudinal slits 11, permitting relative movement of the segmental sleeve-sections, and is formed at the end thereof opposite the disk 8 with an internal trunco-conical socket 12, from which a threaded bore 13 extends to the outer face of the disk 8. The bore 13 is designed for the reception of an exteriorly-threaded locking-bolt 14, provided with a trunco-conical or wedge-shaped head 15, which when drawn into the socket 12 by turning up the screw will expand the sleeve 9, and thus produce sufficient friction between the sleeve and the bracket to securely lock the bearing member or disk 8 in its adjusted positions. The sleeve 9 and the bolt 14 are oppositely threaded, and the bolt and disk are provided, respectively, with tool-receiving slots 16 and 17, which facilitate their adjustment.

The bearing members 7 and 8 are formed with corresponding ball-grooves 18 and 19, which form conjointly one half of a ball-race, the other half of which is defined by a ball-groove 20 in the wall of a circular eye 21 in the hub 6 of the type-arm. One side of the type-arm is imposed against the side of the plate 5 of the bracket, as shown in Fig. 2, and the bearing members 7 and 8 are inclosed within the eye 21, the outer face of the type-bar and the bearing member 8 and the adjacent side face of the base 4 of the bracket being in substantially the same plane. Within the ball-race defined by the grooves 18, 19, and 20 is located a single row of antifriction-bearing-balls 22, constituting the antifrictional bearing for the type-bar. Exclusive of the balls and arm the bearing will be seen to comprehend three parts only, combined in a very narrow compass, devoid of spaces within which dust may accumulate, and arranged to dispose the balls at the longitudinal center of the type-bar, where they are best adapted to resist lateral or torsional strains.

When an adjustment of the bearing is desired—as, for instance, to compensate for wear—the locking-bolt is turned slightly in one direction to relieve the friction between the sleeve 9 and the bracket, the member 8 is then turned to effect a nice adjustment, and the locking-bolt is again screwed up to lock the member 8 in its adjusted position.

Attention is particularly directed to the facility with which the adjustment of the bearing is effected. In practice two screw-drivers are fitted in the slots 16 and 17, the locking-bolt being manipulated with one hand and the bearing member with the other, and attention is further called to the fact that no matter how fine the adjustment of the bearing member may be it is not disturbed by the application of sufficient force to the locking-bolt to effect the rigid retention of the bearing member in its adjusted position. The seat 7ª, projecting laterally from the plate 5 of the bracket 3, is principally designed to give stability to the plate, inasmuch as it constitutes a widened base therefor. Inasmuch, however, as this seat conforms to the periphery of the hub 6 of the type-head and is closely adjacent thereto, it will obviously serve to limit lateral vibration of the type-arm in the event of lost motion being produced in the bearing by continued use of the machine without proper readjustment of the parts.

It is thought that from the foregoing the construction and special utility of my novel type-arm bearing will be clearly apparent to those skilled in the art; but while the present embodiment of the invention is thought at this time to be preferable I desire to be understood as reserving the right to effect such changes, modifications, and variations of the illustrated structure as may fall fairly within the scope of the protection prayed.

What I claim is—

1. The combination with a bearing-bracket, comprising a base, a substantially circular narrow plate upstanding therefrom, an arcuate seat extending beyond the plate at the lower side thereof and an annular bearing member concentric with the plate and extending laterally therefrom above the seat; of a second bearing member in the form of a disk opposed to the outer side or end of the first-named bearing member and adjustable relatively thereto, an external ball-groove formed conjointly in the two members, a type-arm having a substantially circular hub opposed to the upstanding plate of the bracket, said hub being formed with an eye for the reception of the bearing members and with an internal ball-groove, and balls located in the ball-race defined by the several grooves.

2. The combination with a bearing-bracket comprising a base, a narrow plate upstanding therefrom at one side of the edge thereof and an annular bearing member extending laterally from the plate; of a second bearing member in the form of a disk opposed to the first-named bearing member, an internally and externally threaded expansible sleeve extending from the disk and screwed into the bearing-bracket, a locking-bolt screwed into the sleeve and having a wedge-shaped end accessible from the side of the bracket opposite the disk and designed to expand the sleeve to lock the bearing members in their relatively adjusted positions, an external ball-groove formed conjointly in the two members, and a type-arm formed with an eye for the reception of the bearing members and with an internal ball-groove, and balls located in the ball-race defined by the several grooves.

3. The combination with a bearing-bracket having a bearing member and a threaded bore, of a disk having an expansible sleeve screwed into the bore, a type-arm formed with an eye receiving both the bearing member and the disk and having one side face substantially flush with the outer face of the latter, and a locking-bolt screwed into the sleeve and having a wedge-shaped end accessible from the side of the bracket opposite the type-arm.

4. The combination with a bearing-bracket having a peripherally-grooved bearing member and a threaded bore, of a peripherally-grooved disk having an expansible sleeve screwed into the bore and also having a tool-receiving recess in its outer face, a type-arm formed with an eye and with an internal groove and having one side face substantially flush with the outer face of the disk, a locking-bolt screwed into the sleeve and having a wedge-shaped end accessible from the side of the bracket opposite the type-arm, and balls within the ball-race defined by the several grooves.

5. The combination with a bearing-bracket having an annular laterally-extended bearing member, of a second bearing member in the form of a disk opposed thereto, an internally and externally threaded expansible sleeve extended into the bearing-bracket from said disk, and a locking-bolt screwed into the sleeve and having a wedge-shaped end accessible from the side of the bracket opposite the bearing members, a type-arm having an eye for the reception of said bearing members, a ball-race formed conjointly in the bearing members and type-arm, and balls in the ball-race.

6. The combination with a bracket comprising a base, a plate at one edge thereof, and an annular bearing-bracket formed with a peripheral groove and with a threaded bore extending entirely through the bracket, of a second bearing member opposed to the first-named member and having an external groove and an internally and externally threaded sleeve screwed into the bore of the bracket, a type-arm opposed to one side of the bracket and having an eye receiving the bearing members and also having an internal groove, one side of the type-arm being substantially flush with the outer end of the second bearing member, a locking-bolt screwed into the expansible sleeve and having a trunco-conical head accessible from the outer side of the bracket, and balls located in the race defined by the several grooves.

In testimony that I claim the foregoing as my own I have hereto affixed my signature in the presence of two witnesses.

JOHN ASBURY SMITH.

Witnesses:
   J. A. ZEIGLER,
   B. B. BUSWELL.